Sept. 24, 1940.  R. K. HOPKINS  2,216,033
METHOD OF FORMING LINED CONNECTORS
Filed June 1, 1938
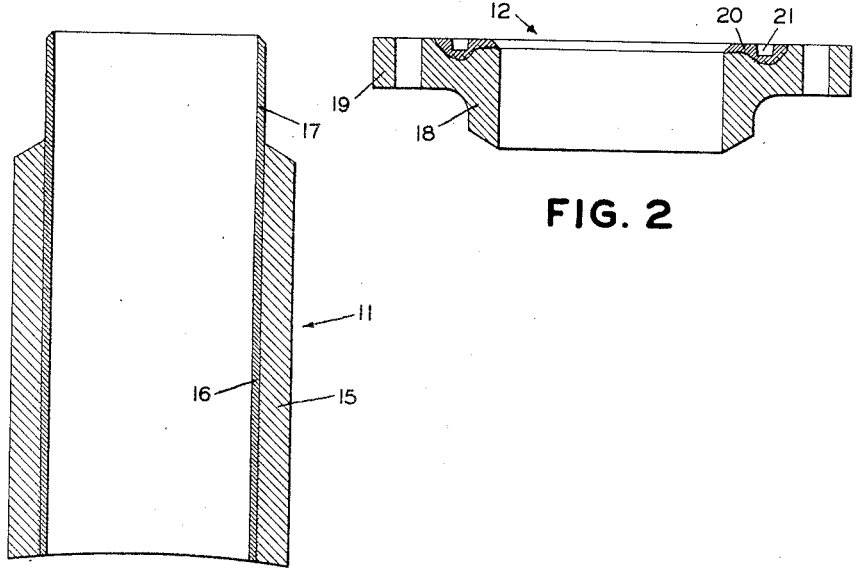
FIG. 2
FIG. 1
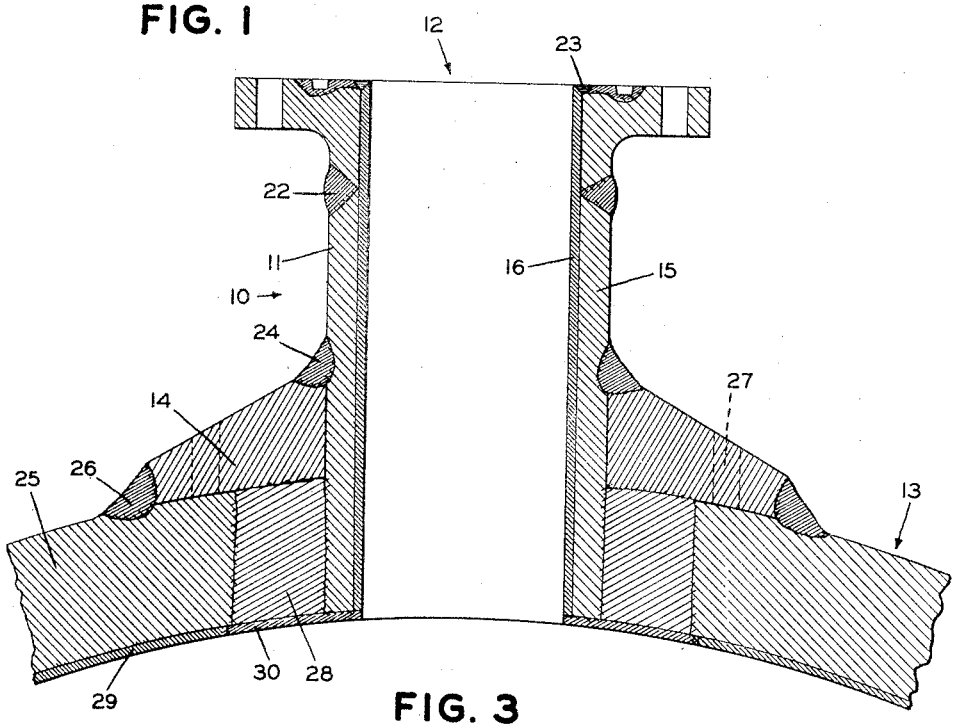
FIG. 3
INVENTOR
ROBERT K. HOPKINS
BY Virgil F. Davis
ATTORNEY Patented Sept. 24, 1940

2,216,033

UNITED STATES PATENT OFFICE 2,216,033

METHOD OF FORMING LINED CONNECTORS

Robert K. Hopkins, New York, N. Y., assignor to The M. W. Kellogg Co., New York, N. Y., a corporation of Delaware Application June 1, 1938, Serial No. 211,144

5 Claims. (Cl. 29—162)

This invention relates to flanged tubular connectors, such as the nozzles, manways, and the like, that form part of pressure vessels and, in particular, to the manufacture of such connectors with the inner surfaces thereof lined with metal of superior corrosion resisting properties.

In the petroleum refining, chemical and similar processing arts, it has become common practice to line the inner surfaces of processing vessels, such as towers, columns, tanks, etc., in which corrosive media are processed, with metal of superior corrosion resisting properties. The linings are sometimes formed separately from the vessel walls and attached thereto, as by welding, but preferably the vessels are formed of metal that includes as an integral part thereof a thickness of lining metal. The latter vessels are superior, especially in high-pressure high-temperature service. To successfully combat corrosion, not only must the vessels be lined, but the tubular connectors, such as nozzles, manways, etc., must also present a corrosion resistant surface to contact with the corrosive media.

At present, this is accomplished by either making the tubular connectors of solid corrosion resistant metal or by making the connectors of steel and providing a separate corrosion resistant lining which is attached to them by welding. The cost of corrosion resistant metal, usually chrome steel or chrome-nickel steel, is such that the cost of connectors of solid corrosion resistant metal, except possibly in small sizes, is prohibitively high. The use of a separate lining is limited to connectors of sufficient diameter to render their inner surfaces accessible for welding. Also, separate linings are a source of constant trouble, especially in high temperature service, as the linings have a tendency to fail at the welds by reason of stresses set up due to temperature gradients, diverse coefficients of expansion, etc.

I have devised a method for fabricating lined tubular connectors which completely solves the problem.

It is the primary object of this invention to provide a flanged tubular connector, of the character mentioned, that includes a body of metal of inferior corrosion resistance and an internal lining of metal of superior corrosion resistance, which lining defines the entire surface exposed to the corrosion media.

The further objects and advantages of the invention will be apparent from the following description and claims taken with the accompanying drawing, in which, Fig. 1 is a fragmentary view of one end of a lined connector prior to the joining thereto of the flange, Fig. 2 is a section of a flange adapted to be joined to the end of the connector of Fig. 1, and Fig. 3 is a sectional view of the completed flanged connector welded to the walls of a lined vessel.

The flanged tubular connector 10 of the invention includes a body or neck 11 at one end of which is a flange 12. The other end of neck 11 is welded to the walls of lined pressure vessel 13. In the assembly shown, a reenforcement ring 14 is included. In low pressure installations, or in high pressure installations when connector 10 is of small diameter, the reenforcement ring 14 may be omitted. Connector 10 may also take the form of an elongated tube or conduit which may be used to convey material to or from a vessel such as vessel 13 shown. In such case, the connector would be provided with flanges 12 at each end. Connector 10 may also take the form of a cylindrical vessel, such as a heat exchanger, and have connector flanges at one or both of its ends.

Body or neck 11 is made of metal that includes a base 15 of metal, such as steel, of comparatively poor corrosion resistance in the intended service, to which is integrally united a lining 16 of metal, such as chrome steel or chrome-nickel steel, of superior corrosion resistance in the intnded service. Composite metal of this character may be produced in the flat form, i. e., plates, sheets, etc., in accordance with the disclosure of my copending applications Serial No. 64,496 for Veneering of metallic surfaces and Serial No. 64,497 for Manufacture of veneered articles, filed February 18, 1936, or it may be produced in the seamless tubular form in accordance with the teachings of my U. S. Patent No. 2,107,943.

When flat metal is used to produce neck and body 11, the metal is shaped into tube form, as by rolling, and the seam closed by welding. The welding on the steel side is performed with electrodes capable of depositing metal of approximately the same analysis as metal 15, or with electrodes of such analysis as to impart special desired characteristics to the weld. The alloy side is preferably welded with electrodes of such analysis as to give a metal deposit at the surface of substantially the same composition as lining 16.

To form the connector 10 of the invention, a metal tube of the character just described is cut to the length of the desired connector. One end is then machined to remove base metal 15 to, or adjacent to, its line of union with metal 16, to form an extending portion 17 of a length sufficient to accommodate flange 12 thereon. The metal 15, at its end adjacent portion 17, is provided with a chamfered surface to facilitate subsequent welding. The metal 16, at the end of portion 17, is also chamfered, as shown, for the same purpose.

Flange 12 and reenforcing ring 14 are then formed. These parts may be formed in any preferred way although, at present, I prefer to form them by forging. Flange 12 comprises a short tubular neck 18 laterally extending at one end to form annular shoulder 19. The flange bore is made of a size to snugly fit over extending portion 17. The end of the flange neck 18 is chamfered to form a welding groove with the chamfered end of metal 15 of neck 11. The length of flange 12 is made substantially equal to that of portion 17.

In forming flange 12 metal is removed from the face and a depth of corrosion resistant alloy deposited, as by arc welding, to form lining 20, which includes annular recess 21 for accommodation of the usual sealing ring. The inner edge of lining 20 is chamfered to provide for subsequent welding.

Reenforcing ring 14 is made of the cross-section shown, or any other preferred cross-section, and of a bore to snugly fit the end of neck 11. Holes may be provided in ring 14 so that it may be plug welded to vessel 13.

In assembling connector 10, flange 12 is positioned on portion 17 and united to neck 11 by the deposition of weld metal 22 in the groove formed by the chamfered ends of necks 11 and 18. Portion 17 and lining 20 are then united by depositing weld metal 23. Weld metal 23 is preferably of the same analysis as metal 16 and lining 20. Ring 14 is then positioned on neck 11 and united thereto by the deposition of weld metal 24. The assembled connector 10 is then united to the walls of vessel 13.

To accomplish this result, a hole is provided in the walls of vessel 13 of a diameter to accommodate the end of neck 11 and to provide a welding groove between the end and the side of the hole of a width sufficient to accommodate the weld metal required to successfully resist the service stresses. The assembled connector 10 is then positioned concentrically in this hole and tack welded to the carbon steel portion 25 of the walls of vessel 13.

The welding groove between the end of neck 11, the bottom of ring 14 and the sides of the hole in the vessel wall is then filled with weld metal 28 substantially to the line separating metal 25 and alloy liner 29. Fillet weld 26 is then deposited to unite the periphery of ring 14 to the wall of the vessel. Plug welds 27 may then be deposited. The welding is completed by depositing alloy metal 30, of substantially the same composition as metal 16 and liner 29, to cover metal 28 and unite metal 16 to liner 29. In this manner a continuous corrosion resistant surface is provided at the joint of connector 10 and vessel 13.

By reason of lining 16, neck 11 does not include the usual corrosion allowance and hence, will be much thinner than an unlined neck designed for the same service. In the usual case neck 11 will be thin enough to weld satisfactorily without development of cracks due to the shrinkage of weld metal 28.

When connector 10 takes the form of a conduit, or other cylindrical member, as the shell of a heat exchanger having connector flanges at one or both of its ends, the proceedure above described for uniting flange 12 to neck 11 will be carried out at the end or ends of the cylindrical body portion.

I claim:

1. The method of uniting lined flanged connectors to the walls of lined vessels which comprises, forming a lined connector body with a portion of the lining extending beyond one end thereof, placing a connector flange on said extending portion, said portion being of substantially the same length as said connector flange, placing a reenforcing flange on said body adjacent the other end thereof, said other end extending beyond said reenforcing flange for a distance substantially equal to the thickness of the wall of the vessel, said connector flange having its face lined with corrosion resistant metal, uniting said body to said flanges by deposition of weld metal, uniting said portion to the lining of said face by deposition of corrosion resistant weld metal, placing said other end concentrically in a hole in the vessel wall, uniting said reenforcing flange and said other end to the vessel wall by deposition of weld metal, and depositing corrosion resisting weld metal to unite said lining of said other end with the lining of said vessel.

2. The method of uniting lined flanged connectors to the walls of lined vessels which comprises, forming a tubular member that includes a metal base to which is united a corrision resistant lining, removing base metal from one end of said member to form an extending portion of reduced thickness, placing a connector flange on said extending portion, placing a reenforcing flange on said member adjacent the other end thereof, said extending portion being of substantially the same length as said connector flange and said other end extending beyond said reenforcing flange for a distance substantially equal to the thickness of the wall of the vessel, said connector flange having its face lined with corrosion resistant metal, uniting said member and said flanges by deposition of weld metal, uniting said extending portion to the lining of said face by deposition of corrosion resistant metal, placing said other end concentrically in a hole in the vessel wall, uniting said reenforcing flange and said other end to the vessel wall by deposition of weld metal, and depositing corrosion resistant weld metal to unite the lining of said other end with the lining of said vessel.

3. The method of uniting lined flanged connectors to the walls of lined vessels which comprises forming a tubular member that includes a metal base to which is united a corrosion resistant lining, removing base metal from one end of said member to form an extending portion of reduced thickness, placing a connector flange on said extending portion, placing a reenforcing flange on said member adjacent the other end thereof, said extending portion being of substantially the same length as said connector flange and said other end extending beyond said reenforcing flange for a distance substantially equal in length to the thickness of the wall of the vessel, said connector flange having its face lined with corrosion resistant metal, uniting said member and said flanges by deposition of weld metal, uniting said extending portion to the lining of said face by deposition of corrosion resistant metal, placing said other end concentrically in a hole in the vessel wall of a size to form a welding groove of desired width between the sides of said hole, said reenforcing flange and said other end, filling said welding groove with weld metal, and covering the weld metal in said groove with corrosion resistant weld metal to unite the lining of said vessel with the lining of said connector.

4. The method of forming corrosion-resistant, lined connectors which comprises the steps of forming a tubular member including an outer shell of base metal and a bonded lining of corrosion-resistant metal, particularly characterized by a single, substantially uniform, unbroken bond throughout the entire area of contact between lining and shell, removing base metal about one end of said tubular member to form a portion of reduced diameter; forming a flange having a bore adapted to receive said portion; coating the face of said flange with corrosion-resistant metal; placing said flange on the reduced portion of said tubular member; uniting said flange with said tubular member by deposition of weld metal; and uniting the coating of said flange with the lining of said tubular member by deposition of corrosion-resistant weld metal to form a continuous, corrosion-resistant coating on the inner walls and flange face of the connector.

5. The method of forming corrosion-resistant, lined connectors which comprises the steps of forming a tubular body of the length of the desired connector, said body including an outer shell of base metal and a corrosion-resistant lining joined thereto by a single, substantially uniform, unbroken bond extending throughout the entire area of contact therebetween; removing base metal about one end of said tubular body to expose a section of said lining; forming a flange having a bore adapted to receive the exposed section of lining; coating the face of said flange with corrosion-resistant metal; placing said flange on said exposed section of lining, the latter completely lining the bore of said flange; uniting said flange to said body by deposition of weld metal; and uniting said exposed section of lining to the metal coating on said flange by deposition of corrosion-resistant weld metal.

ROBERT K. HOPKINS.